United States Patent

Chow

[15] 3,680,067

[45] July 25, 1972

[54] DOMAIN PROPAGATION CIRCUIT

[72] Inventor: Woo Foung Chow, Berkeley Heights, N.J.

[73] Assignee: Bell Telephone Laboratories, Incorporated, Murray Hill, N.J.

[22] Filed: Nov. 16, 1970

[21] Appl. No.: 89,821

[52] U.S. Cl...............340/174 TF, 340/174 GA, 340/174 SR

[51] Int. Cl.....................................G11c 15/00, G11c 11/14

[58] Field of Search...............................340/174 TF, 174 SR

[56] References Cited

UNITED STATES PATENTS 3,541,535 11/1970 Perneski...........................340/174 TF

*Primary Examiner*—James W. Moffitt
*Attorney*—R. J. Guenther and Kenneth B. Hamlin

[57] ABSTRACT

An autonomous scanning circuit is realized by an arrangement of magnetically soft elements on the surface of a material in which single wall domains can be moved. Information representative of the conditions of a set of lines is stored in a domain register and compared with that of a previous scan period similarly stored. The expected one of two significant outputs from any given line is controlled by a unique domain circuit which remembers the next preceding output associated with that line.

15 Claims, 5 Drawing Figures

INVENTOR
W. F. CHOW
BY Herbert M. Shapiro
ATTORNEY

DOMAIN PROPAGATION CIRCUIT

FIELD OF THE INVENTION

This invention relates to data processing arrangements, particularly arrangements which capitalize on the capabilities of single wall magnetic domain devices for their realization.

BACKGROUND OF THE INVENTION

A single wall domain is a magnetic domain encompassed by a single domain wall which closes on itself in the plane of the medium in which it moves. Such a domain is a stable, self-contained entity free to move anywhere in the plane of the medium in response to offset attracting magnetic fields.

Magnetic fields for moving domains are often provided by an array of conductors pulsed individually by external drivers. The shape of the conductors is dictated by the shape of the domain and by the material parameters. Most materials suitable for the movement of single wall domains exhibit a preferred direction of magnetization normal to the plane of movement and are magnetically isotropic in the plane. Conductors suitable for domain movement in such materials are shaped as conductor loops providing magnetic fields in first and second directions along an axis also normal to the plane. By pulsing a succession of conductors of the array consecutively offset from the position of a domain, domain movement is realized. In practice, the conductors are interconnected serially in three sets to provide a familiar three-phase shift register operation. The use of single wall domains in such a manner is disclosed in U.S. Pat. No. 3,460,116 of A. H. Bobeck, U. F. Gianola, R. C. Sherwood, and W. Shockley, issued Aug. 5, 1969.

An alternative propagation technique involves the generation of a reorienting magnetic field in the plane of movement of domains. Such a technique employs an overlay of magnetically soft elements oriented with respect to one another to respond to a uniform in-plane field to generate changing magnetic pole patterns which attract domains to consecutive positions in a propagation channel.

The latter propagation technique is particularly useful for large capacity sequential memories such as disc files. In such arrangements, no electrical conductors are necessary except where a peculiar function is to be implemented locally. But advantage may be taken of the geometry of the magnetic overlay to achieve certain functions without conductors. For example, a domain generator which avoids the necessity for electrical conductors is shown in copending application, Ser. No. 756,210, filed Aug. 29, 1968, for A. J. Perneski now U.S. Pat. No. 3,555,527.

The overlay technique is characterized by additional flexibility also. Such flexibility is demonstrated in copending application, Ser. No. 038,124, filed May 18, 1970, for P. I. Bonyhard and I. Danylchuk. That application discloses a multistage shift register channel defined by overlay elements which circulate a domain locally at each stage unless a next subsequent domain is present. In that case, the circulating domain is advanced one stage due to domain interaction. When the entire channel is filled, a subsequent domain causes a domain to be expelled from the opposite end of the channel much as an impact against the first of a line of touching billiard balls causing the last of the line to move. When operating in this mode, a register is called a "compressor." Domain interaction thus is an important property for realizing flexibility of operation with overlay circuits.

Another important property is that all domain movement in such overlay arrangements is caused by the pole patterns generated by the in-plane field. Therefore, all movement is synchronous. The two properties, domain interaction and synchronous movement, are important tools in realizing a flexible overlay scanning arrangement in accordance with this invention.

BRIEF DESCRIPTION OF THE INVENTION

The present invention comprises an arrangement in which the properties of domain interaction and synchronous movement of domains permit consecutive logic operations to be performed between corresponding representations of different sets of information representations solely within magnetic domain technology if those representations are organized in a form to capitalize on those properties. If, for example, a circuit is to supply a first or a second signal indicative of the status change of each of a set of lines, domain patterns representative of the signals last supplied by such a circuit can be organized to interact directly with a domain pattern representative of update information for those lines to determine the signals next supplied by the circuit. In one such operation, a domain shift register operates as a sequential memory for storing domain patterns which control the signals last supplied for direct interaction and thus updating in accordance with domain patterns reflective of changed conditions in the lines.

In one embodiment in accordance with this invention, a circuit for scanning $n$ lines (viz., telephone station auxiliary lines) for signaling changes of conditions indicative of service requests is realized. The circuit comprises a sheet of material in which single wall domains can be moved, an arrangement of magnetically soft overlay elements for moving domains in response to a magnetic field rotating in the plane of the sheet, and a source of that rotating field. The overlay is of a geometry to define first and second shift register channels into which information representative of line conditions of a set of lines and the complement of that information is stored respectively. The stored information is advanced $n$ stages into continuations of the first and second registers and information representative of the next subsequent (present look) conditions of the set of lines is stored. The advanced information comprises the last look conditions in a manner disclosed in U.S. Pat. No. 3,430,001 of U. F. Gianola, R. A. Kaenel, and H. E. D. Scovil, issued Feb. 25, 1969. Continuations of the first and second registers thus may be understood to function as last look stores for line condition information and the complement thereof respectively.

Corresponding bits of the present and last look information are compared with one another as are the complements of those bits. This is accomplished by physically altering the path of the registers so that the corresponding bits of the present and last look stores physically approach one another. An interaction results if a domain is present in the associated positions of both the present and last look stores. The presence of two domains for interaction indicates the presence (persistence) of an off-hook condition at a particular line in two consecutive scan periods. If a domain is present in only one of the corresponding bits of the two stores, indicating a change in condition on the line between two consecutive scan periods, that domain is annihilated if it occurs in a last look store and advanced if it occurs in a present look store.

A separate closed loop register is located at the terminus of each of the last look stores. Information is stored again in complementary form in these two closed loop registers. Also, each of the closed loop registers has $n$ stages. Accordingly, there is a domain - no domain pair circulating synchronously in these closed loop registers corresponding to each indication (domain) advancing along the information or complement register (representing a persistent off-hook or no off-hook condition respectively.

An output at the terminus of only one of the last look stores is enabled (controlled) by the presence of a domain (of the circulating domain - no domain pair). An advancing domain in the last look store of either the information or complement register produces an output only if a domain is present in the closed loop register associated with its output for interaction. The two closed loop registers, in addition, are interconnected by a domain compressor circuit such that an interaction which produces an output also transfers a domain to its alternate position (viz., reversal of the domain - no domain pair). Consequently, not only does the circulating domain enable an output at one of the termini but also the interaction enabling the output reverses the information (viz., the location of the domain of the domain - no domain pair) associated with a particular line in the two closed loop registers such that an output next occurs for a particular line only when the representation of the alternative persistent condition for that line occurs.

DETAILED DESCRIPTION

Figure 1:
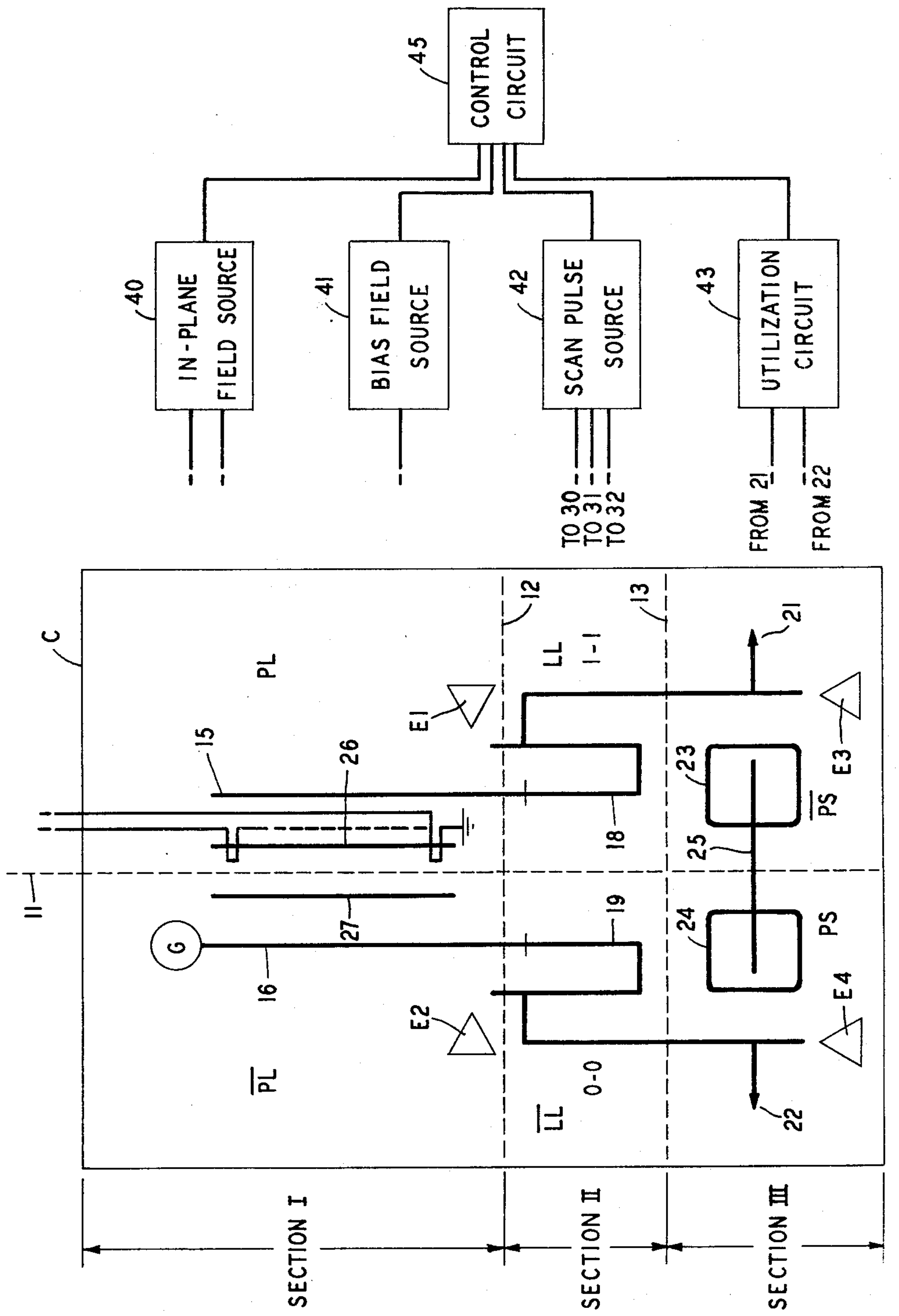
FIG. 1 is a line diagram of the system organization of a scanning circuit in accordance with this invention.

FIG. 1 is a line diagram of the system arrangement of an autonomous scanner in accordance with this invention. It is helpful to recognize the symmetry of the arrangement about an imaginary axis represented by vertical broken line 11 in the figure. We will adopt the convention that portions of the arrangement to the right of the axis, as viewed in FIG. 1, will be designated arbitrarily by the term "information" as, for example, information present look register. The portions of the arrangement to the left of the axis similarly will be termed "complementary." For every information portion there is a complementary portion.

It is also helpful to visualize the arrangement as divided into three sections I, II, and III along the path of information flow from top to bottom as viewed in FIG. 1. This division is represented by imaginary horizontal broken lines 12 and 13 in FIG. 1. In section I, accordingly, we have input information and complementary present look registers 15 and 16, and in section II we have information and complementary last look registers 18 and 19. In section III we have information and complementary outputs 21 and 22 and information and complementary closed loop recirculating registers 23 and 24. Registers 23 and 24 are interconnected by a compressor circuit or register 25. It will become clear that section I functions as a present look store, section II as a last look store, and section III as a corrected last look store in the jargon of the scanning art.

The operation of each of these sections will be described along with the cooperation of each section one with another as well as the overlay geometry which defines the movement and interaction of domains in a juxtaposed sheet of magnetic material to achieve the operation. The description will culminate with a summary of the general operation in block diagram terms familiar in the scanning art.

Section I operates to provide complementary representations (viz., domain patterns) of the conditions of a plurality of lines in a pair of domain channels. The section comprises the input information and complementary present look registers 15 and 16 along with an arrangement for recording initially the conditions of $n$ lines in the illustrative arrangement. The recording arrangement comprises magnetically soft permalloy elements defining recording information and complementary registers 26 and 27 as shown in FIG. 1. Domains are not moved along registers 26 and 27. Rather, they are displaced only laterally there, illustratively, by pulsed electrical conductors to provide patterns in associated channels 15 and 16 as is now explained more fully.

Each of registers 15 and 16, on the other hand, is a familiar single wall domain register defined illustratively by bar and T-shaped overlay elements for moving domains therealong in response to a magnetic field rotating in the plane of a juxtaposed crystal C. The operation of such a circuit is familiar in the art and not described further here. The two registers 15 and 16 are physically separated by the two recording registers 26 and 27, as shown in FIG. 1. Each of the registers 15, 16, 26 and 27 is $n$ stages long.

In operation, a sequence of n domains is generated at G for movement in register 16 downward as viewed. A suitable generator for providing a domain for each rotation of the in-plane field is disclosed in the above-mentioned copending application of A. J. Perneski. In n rotations of the in-plane field, $n$ domains occupy the $n$ stages of register 16.

Figure 2:
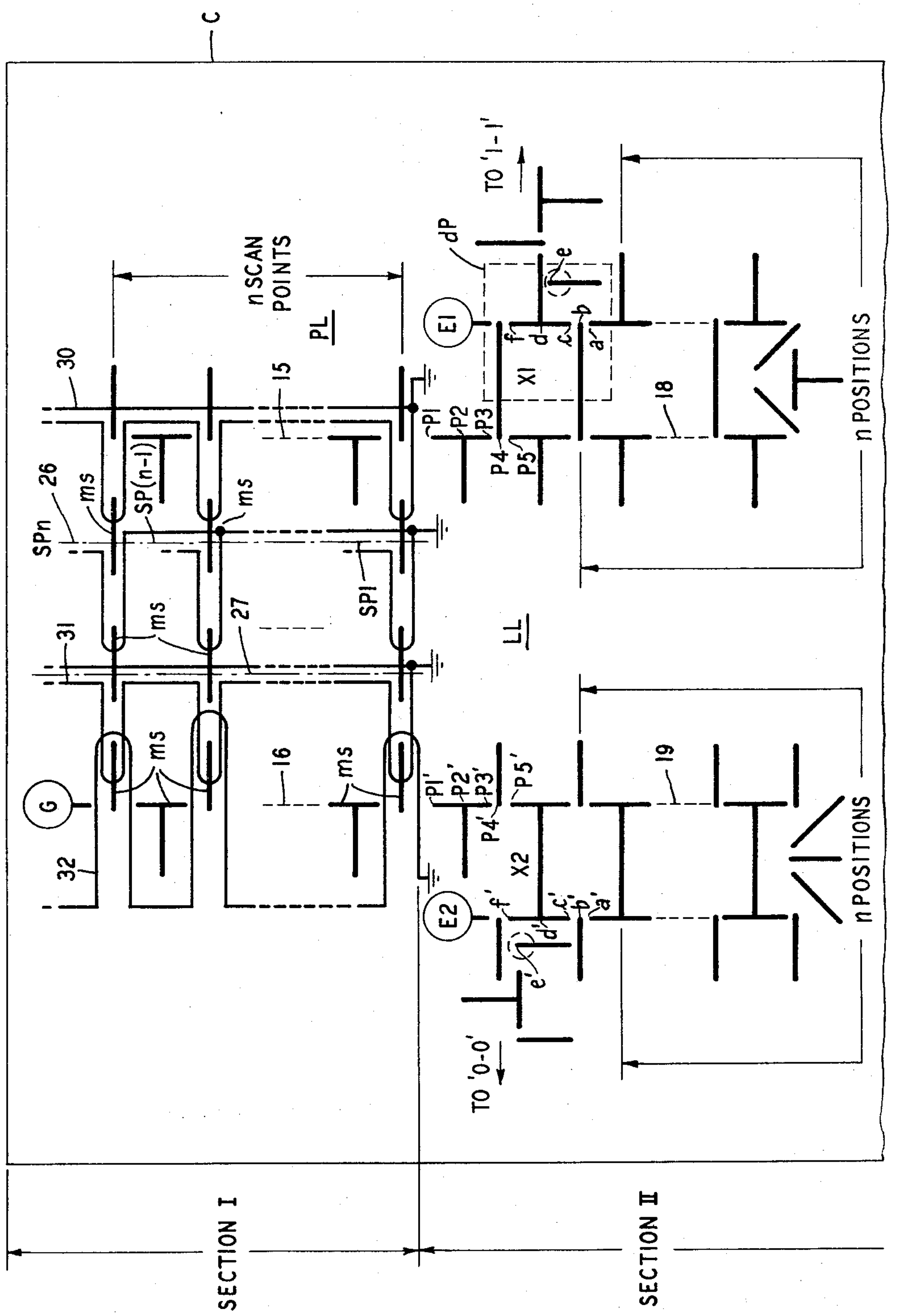
FIGS. 2, 3, and 4 are schematic representations of portions of the circuit of FIG. 1 showing magnetic overlay patterns for defining various functional areas therein.

FIG. 2 shows the overlay geometry and conductor arrangement of the input section of FIG. 1 in detail. The figure shows the familiar T and bar-shaped elements of the overlay arrangement, each element being designated *ms* for "magnetically soft." It is to be noted that the bars of registers 15 and 16 are associated with bars similarly oriented and spaced along registers 26 and 27.

The figure also shows a number of conductor loops. The loops associated with register 26 are designated SP$n$, SP($n$–1), SP($n$–2), . . . etc., the designation "SP" signifying "scan point." Each of these loops is discrete, associated with a different line which may be a telephone auxiliary line, and generates a magnetic field to attract domains from associated stages of register 27 when a current (i.e., off-hook) appears on the conductor.

In addition, the figure shows three conductors 30, 31, and 32, each of which includes a plurality of conductor loops which couple associated sets of magnetically soft bars. The loops of conductors 30, 31, and 32, specifically, couple the bars of register 15, register 27, and register 16, respectively. The loops of conductors 30 and 31 also can be seen to extend to encompass portions of the bars associated with register 26 and register 16, respectively, whereas the loops SP$i$ encompass portions of corresponding bars associated with register 27.

A scan operation is initiated by filing register 16 with domains as stated above and by pulsing conductor 31 thereafter to move all the domains in register 16 to the left side of the magnetically soft bars of register 27 as viewed in FIG. 2. Conductor 31 is pulsed when the in-plane magnetic field is directed to the left in FIG. 2 so that the domains occupy positions at the left end of the bars encompassed by the loops of conductor 31 when the conductor is pulsed.

If a current exists in any of the conductor loops SPi, the associated domain moves to the left side of register 26 because of the attracting field associated with such current. Thereafter, both conductors 30 and 32 are pulsed. The pulse in conductor 30 operates to move domains associated with register 26 to positions to the left end of corresponding bars of register 15. Similarly, the pulse in conductor 32 operates to move domains associated with lines SPi for which no (off-hook) currents exist to the left end of associated bars of register 16.

During the scan operation, the in-plane field remains directed to the left.

The scan operation is now complete with a domain pattern representative of the pattern of (off-hook) currents in the lines stored in the information register 15 whereas the domain pattern representative of the pattern of no (off-hook) currents in lines is stored in the complement register 16.

FIG. 2 shows the bar and T-shaped elements of registers 15 and 16 extending downward, as viewed, beyond conductors 30 and 32 into section II for an additional $n$ stages (or positions). It is important to note that each of these extensions 18, and 19, turns on themselves as is clear from FIG. 1. The overlay elements are disposed to form "decision points" designated *dp* as shown in FIG. 2 and described only for the information register 18. It is to be understood, however, that the complementary register 19 includes a similar decision point which operates synchronously and in analogous fashion.

A domain pattern formed in section I in the information register 15 (as well as the pattern formed simultaneously in complementary register 16) is advanced, at the conclusion of the scan operation, $n$ stages, into the extension of the register(s) shown in section II. A second scan operation, identical to that described above now occurs, the in-plane field being maintained in a leftward direction as before during the operation. A new domain pattern stored at this time may be thought of as the "present look"; the previous pattern of domains now advanced into section II may be thought of as the "last look." It is appropriate therefore that section I be designated the "-present look store," PL, and section II be designated the "last look store," LL.

Consider the situation where two scan period have occurred and both the present and last look stores are occupied by domain patterns. The information is now advanced, consecutive representations in both the present and last look store entering decision point dp. In this context, the decision point dp can be understood to perform a logic function between consecutive representations of the conditions of each of the lines scanned. The logic is performed by taking advantage of the interaction between domains as shown in R. H. Morrow and A. J. Perneski, application Ser. No. 759,148 filed Jan. 30, 1969 now U.S. Pat. No. 3,577,131. For example, the overlay elements at the decision point are disposed so that if a domain occurs at both positions *a* and P1 in the extension of register 15, thus indicating a current in a given one of conductors SPi during two consecutive span periods, the domains interact causing the domain at *a* to follow the path *a*, *b*, *c*, *d*, *e*, as the in-plane field rotates (clockwise). The domain can be seen to move to the right as viewed along a further extension of register 15 designated '1—1'. The designation '1—1' indicates that a domain moves therealong only if a domain (a binary 1) occurs in positions P1 and *a* simultaneously. The consecutive domain positions P1, P2, P3, P4, and P5 are shown in FIG. 2 to provide an aid to the reader in relating domain position to in-plane field orientation. The field in rotating clockwise one rotation moves a domain from position P1 to position P5.

Of course, if a domain were absent in either the present or last look store when a decision is made at dp, no domain advances along '1—1'. If, for example, the last look store has a domain absent (at *a*), there is no domain to advance along '1—1' regardless of whether or not a domain is present at P1 at the critical time. On the other hand, if a domain were absent at P1, no interaction would occur to direct a domain to *e*. The domain at *a*, in this latter instance, would follow the path *a*, *b*, *c*, *d*, *f*, moving upward as viewed to a familiar domain annihilator E1 where it is extinguished.

A similar analysis indicates that a domain advances along the register '0—0', on the complementary side of the arrangement of FIG. 2 only if a domain were present at positions *a'* and P1' simultaneously. In this instance, the presence of domains indicates no currents in the associated line during two consecutive scan periods. The designation '0—0' indicates such a condition.

The in-plane field is again directed to the left when a third scan period is initiated. A new pattern of domains, as well as the complement of that pattern, is stored in section I of the arrangement of FIG. 2. The patterns of domains which have already advanced beyond the decision point dP, and the complements thereof, have moved synchronously along register '1—1' or '0—0', into section III of FIG. 1.

It is helpful to recognize the significance of the information which moves into section III. A domain in register '1—1' or '0—0' represents, in the first instance, a current in a particular line ($SP_i$) for two consecutive scan periods and, in the second, the absence of a current in a particular line for two consecutive scan periods. Naturally, domains cannot appear in both registers '1—1' and '0—0' simultaneously in a position representative of a single line. Clearly, a change in the condition of a particular line is indicated, in the illustrative embodiment, by a domain in the associated position of either register '1—1' or '0—0' (but not both) followed by a domain in the associated position of the other of the two registers at a later time. It is also clear that when a domain enters a first of registers '1—1' and '0—0' representing a first persistent condition of a given line, the only significant event occurring next for that line will be represented by a domain in the associated position of the second of those registers representing a second persistent condition.

Figure 3:
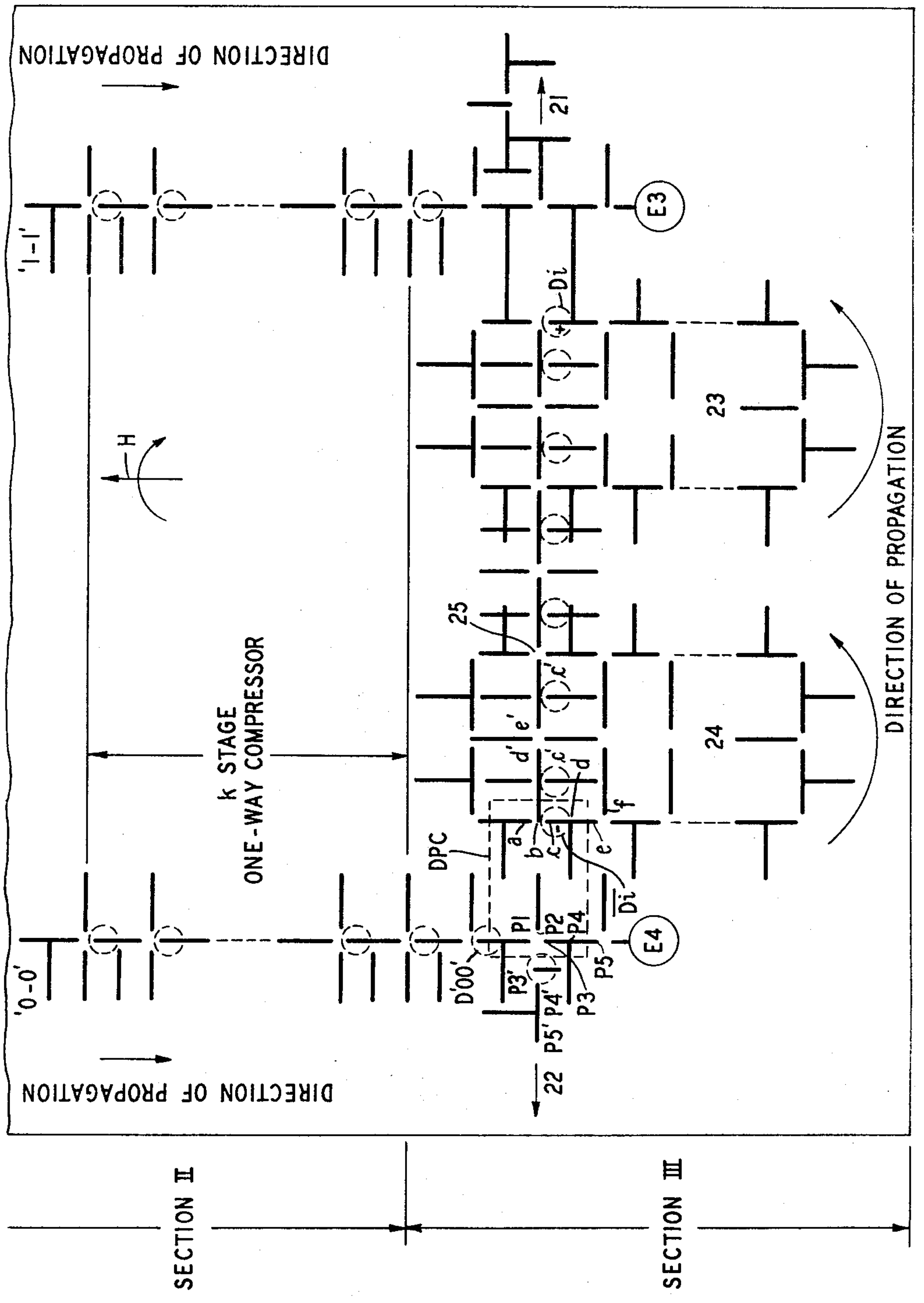

In order to expedite movement of domains in registers '0—0' and '1—1', these registers operate as compressor circuits and are shown in FIG. 3 fully occupied by domains to so function.

The overlay geometry of section III is designed to respond to information representations of the form described to provide outputs at 21 or 22 of FIGS. 1 and 3 representative of the first and second changes in line conditions as described above. To be specific, section III comprises a pair of closed loop or "recirculating" information and complementary registers 23 and 24 defined by T and bar-shaped overlays to circulate information in response to a clockwise rotating in-plane magnetic field.

Each of the closed loop registers has *n* stages, one for each of the lines scanned. Accordingly, a stage of the information recirculating register 23 is associated with a corresponding stage of the complementary recirculating register 24 and those associated stages can be associated with a given one of the *n* lines scanned. Each associated pair of stages in registers 23 and 24 includes a domain - no domain pair. That is to say, only one stage of each pair of associated stages includes a domain. This is represented in FIG. 3 by the encircled plus sign (Di) representing a domain (information) and the encircled minus sign ($\overline{\text{Di}}$) representing the absence of a domain (complement).

The domain pairs associated with consecutive lines occupy the strategic positions shown in FIG. 3 consecutively. The importance of the positions is twofold. First, the positions are not only part of recirculating registers 23 and 24, they also comprise, illustratively, the terminal positions of a compressor register 25, as indicated in FIG. 1. A compressor register, it will be recalled, functions to dislodge a domain at one end when a domain enters the other. The novel arrangement of a pair of recirculating registers, each having a stage comprising the terminus of a compressor register will be seen to function to remember the previous persistent condition of each line scanned in terms of the position occupied by the absent domain of the recirculating domain - no domain pair. Since the scan operation, the propagation of domains, domain interaction, and domain pair recirculation are all synchronized by the rotating in-plane magnetic field, the representations of the last persistent condition of consecutive lines, appear consecutively at the strategic positions occupied by D*i* and $\overline{Di}$ in FIG. 3.

By the same token, the position occupied by the domain (D*i*) of each domain - no domain pair signifies the next expected persistent condition, that is to say, the condition opposite to the last condition for the associated line. It is to be recalled that only two types of changes in condition are significant for a scanned line in the illustrative arrangement.

Now it will be shown that the domain of each domain - no domain pair enables the output 21 or 22 to produce an output signal when a domain advances along the associated register '1—1' or '0—0'. The operation at this juncture is described with respect to the complementary portion of section III of FIG. 3. It is to be understood that, as before, the overlay geometry of the information portion of section III is designed to produce a like operation. Consider the condition represented in FIG. 3 by absent domain $\overline{Di}$ occupying position C and the associated domain D*i* occupying the position shown in the figure. This condition is assumed to be followed by a new condition in which a domain Di associated with a next subsequent line, occupies position C in FIG. 3 and the associated absent domain $\overline{Di}$ occupies the position previously occupied by domain Di in FIG. 3.

Figure 4:
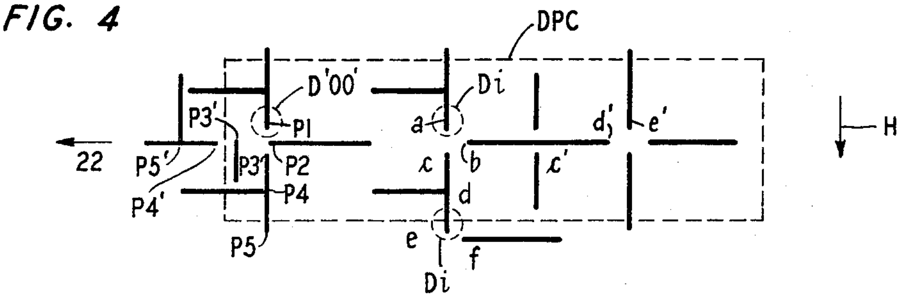

Broken block DPC of FIGS. 3 and 4 represents a decision point on the complementary side of section III. Register '0—0' is a compressor register of *k* stages designed to move information from section II to decision point DPC in one rotation of the in-plane field. If a domain D'00' is so moved, and if the domain D*i* of the associated domain - no domain pair, of registers 23 and 24, occupies the position C previously shown occupied by absent domain $\overline{Di}$ in FIG. 3, assumed to be the new condition, an interaction will occur between domains D'00' and D*i*.

The detailed operation of the interaction can be demonstrated if we assume the presence of a domain D'00' in section II for movement along register '0—0'. A compressor, it is recalled, is entirely occupied by domains (see the circles in '0—0' of FIG. 3). When a domain enters a compressor, the information represented by it appears at the terminal stage within one cycle of the in-plane field. We can assume, accordingly, that domain D'00' in FIG. 3 occupies the position shown adjacent decision point DPC when the in-plane field is directed upward as indicated by the arrow H in the figure.

When the field next rotates 180 degrees to a downward position as viewed in FIG. 4, domain D'00' moves to position P1 of decision point DPC. Absent domain $\overline{Di}$ of FIG. 3 is moved downward to position *e* as shown in FIG. 4 at this time and a domain D*i*, associated with the line the condition of which is represented by D'00', is moved to position *a* in FIG. 4. The decision point is shown expanded in FIG. 4 to illustrate more clearly the magnetic condition when the field is directed downward as indicated by the arrow H in the figure.

When the in-plane field rotates 90° further to a leftward orientation, domain D'00' and domain Di move to positions P2 and *b* of FIG. 4 respectively. As the in-plane field rotates further, however, domain interaction forces domains D'00' and D*i* to follow the paths P2, P3', P4', P5', and *b*, *c'*, *d'*, *e'*, respectively. The former becomes an output at 22 while the latter becomes an input to compressor 25.

The position occupied by the domain D*i* of the domain - no domain pair, associated with the line the condition of which was represented by domain D'00' of FIGS. 3 and 4, is now switched via the compressor to its alternate position occupied by domain Di in FIG. 3. The arrangement, accordingly, will now respond only to a persistent off-hook indication (viz., a domain in register '1—1') for that line, at which time this procedure is reversed.

Of course, if a domain D'00' advances in register '0—0' at a time when a domain D*i* of FIG. 4 is absent, no interaction occurs, no output appears, and the domain D'00' advances along path P1, P2, P3, P4, and P5 to an annihilator E4 shown in FIG. 3. If, on the other hand, no domain D'00' is advanced and a domain D*i* is present, again no interaction occurs, no output occurs, and domain D*i* follows the path *a*, *b*, *c*, *d*, *e*, and f in FIG. 4.

We have now demonstrated that the entire function of an autonomous line scanner can be achieved by the proper design of a magnetically soft overlay on a sheet of material in which single wall domains can be moved in the absence of external logic. It is helpful to recapitulate that operation in terms of the line diagram of FIG. 1 and to represent the various functions performed by conventional symbols in the scanning art. Once this is accomplished, a truth diagram and a flow diagram of that operation can be established.

Consider the function of section III of FIG. 1. The two registers 23 and 24, each, have *n* stages associated with the *n* lines scanned. A domain is stored in only one of the like stages of registers 23 and 24 associated with each of the lines. That domain indicates the last condition which persisted for two scan periods for the associated line.

Section I of FIG. 1 functions to store the set of line conditions during a given scan period. Section II functions to store the line conditions of section I which are advanced to it prior to a subsequent scan period.

A logic operation occurs between consecutive representations of line conditions for each line as the information is advanced. This logic operation generates a domain for movement into section III of FIG. 1 only when a like (persistent) condition is identified for a particular line for two consecutive scan periods. Two kinds of like conditions are identified. The first comprises off-hook indications in two consecutive scan periods. This persistent condition is represented by a domain in register 1—1 in section II of FIG. 1. The second comprises on-hook conditions for a particular line for two consecutive scan periods. This is represented by a domain in register 0—0 in section II of FIG. 1.

The domains representing the persistent condition, in each instance, is applied to section III of FIGS. 1 and 3 at the interaction points DPC where the representation is compared with the associated information in registers 23 or 24. When a match occurs (viz., a domain in register 1—1 and a domain in register 23 in the associated position) a change in the persistent condition for a line is indicated. Consequently, an output occurs and the domain in register 23 is moved on its complementary position in register 24.

It is clear then that a persistent condition provides an output and updates or "corrects" the position of the domain in register 23 to the associated position in register 24. Therefore, a domain in a position in register 24 indicates the last persistent condition for the associated line which produced an output—the "previous" (persistent) state (store) PS for that line.

Section I of FIG. 1 can be thought of as a present look store PL and section II can be thought of as the last look store LL as stated hereinbefore. But the fact that a complementary representation is employed introduces a complication in the notation. Consider only the arrangement to the right of vertical line 11 in FIG. 1—section I is designated PL and section II is designated LL. To the left of line 11, the complementary arrangement is designated $\overline{PL}$ and $\overline{LL}$. In section III of the arrangement, the described operation indicates that the opposite notation is in order. That is, that register 24 to the left of line 11 should be designated PS (previous store) since it records the last persistent conditions in register 1—1 whereas register 23 should be designated $\overline{PS}$ similarly.

The operation of section III may be understood in these terms simply as a comparison of each persistent indication in a register LL with the complement (in register 23) of the previous persistent condition for a given line. This comparison occurs at DPC in FIG. 3 and results not only in an output indicative of a change in persistent condition but in an updating of the previous persistent condition indication, designated CLL (for Corrected Last Look) herein, which entails the movement of a domain from register 23 to the associated position in register 24.

Section III of FIG. 1, at this juncture, indicates that the last persistent signal for the line of interest was a persistent off-hook signal and that the arrangement will next provide a signal (at 22) for that line only when a persistent on-hook signal next appears for that line on register 0—0 for comparison.

Figure 5:
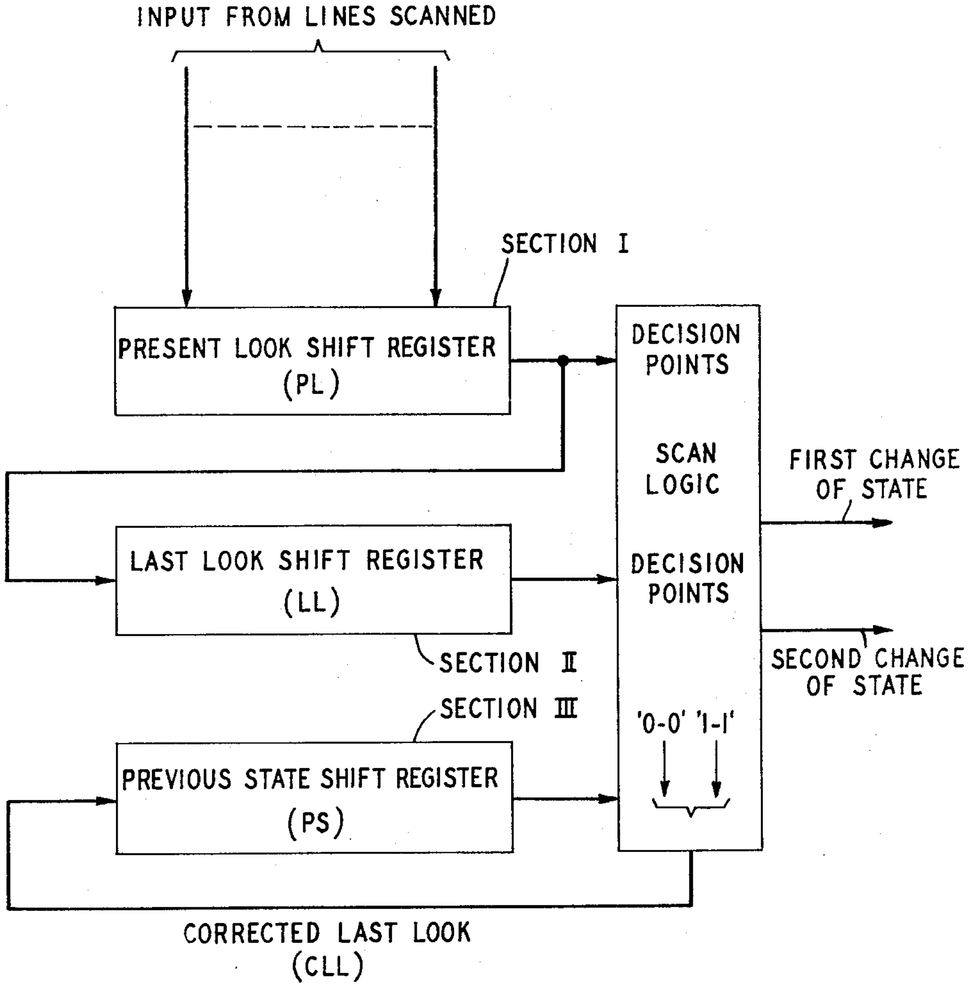
FIG. 5 is a block diagram of the flow of information in the arrangement of FIG. 1.

We can represent the overall operation of the arrangement of FIG. 1 by the flow diagram of FIG. 5 familiar in the scanning art. The transfer of a domain between registers 23 and 24 was designated CLL. All described logic operations are represented by a block entitled "scan logic" from which the outputs appear. Sections, I, II, and III of FIG. 1 are represented in FIG. 5 by blocks entitled "present look", "last look" and "previous state" registers with information flowing between the blocks as indicated by the arrows.

In this context, the table below summarizes the described operation in terms familiar in the art.

| Time PL | LL | PS | CLL | State Per- sistent) | Change of State |
|---|---|---|---|---|---|
| On-hook 0 | 0 | 0 | 0 | 0 | 0 |
| Δ to off-hook 1 | 0 | 0 | 0 | 0 | 0 |
| 1 | 1 | 0 | 1 | 1 | 1 |
| 1 | 1 | 1 | 1 | 1 | 0 |
| Δ to on-hook 0 | 1 | 1 | 1 | 1 | 0 |
| 0 | 0 | 1 | 0 | 0 | 1 |
| 0 | 1 | 0 | 0 | 0 | 0 |
| Δ to off-hook 1 | 0 | 1 | 1 | 1 | 0 |

The table follows directly from a recognition that the organization to the right of line 11 in FIG. 1 operates as the present look store PL, last look store LL, and the complement of the previous state $\overline{PS}$ for sections I, II, and III as shown in the figure, whereas to the left of line 11 the organization operates as the complement of the present store $\overline{PL}$, the complement of the last look store $\overline{LL}$, and the previous state PS. The table omits redundant information $\overline{PL}$, $\overline{LL}$, $\overline{PS}$, et cetera because the values would be opposite to those of PL, LL, and PS shown. If we read across the top line of the table, for example, a zero in both the PL and LL columns indicates the absence of a domain in the 1—1 register of FIG. 1.

A zero in the PS column signifies a domain in register 23 of FIG. 1. Under these conditions, there is no updating of registers 23 and 24, which means CLL is zero, the persistent state of the line represented is zero, and (a zero in the change of state column indicates) that no signal is provided at 21 in FIG. 1.

An off-hook condition is next initiated as represented in the second line of the table by the "1" in the PL column. During the next scan, the "1" persists in the PL column and appears also in the LL column as shown in the third line of the table. A correction of the PS registers (23 and 24) occurs at this juncture, the persistent state of the line is changed, and an output occurs. These results are indicated in the third line of the table by a "1" in each of the columns CLL, STATE, and CHANGE OF STATE. Similar changes occur as shown in the table in response to further changes in line condition to on-hook and then to off-hook conditions as indicated to the left of the table.

A decision point of FIG. 2 between present and last look stores in accordance with the illustrative embodiment operates to pass a domain to an annihilator for extinction. This need not be the case. Alternatively, recirculating channels may be defined by overlay elements to connect the positions occupied by annihilators E1 and E2 and generator G in FIG. 2. In this instance, neither the annihilators nor the generator are employed and domains are merely recirculated. The complementary organization of the scanner is particularly well suited for such operation.

It may be recognized further that changes in line conditions (0—1 or 1—0) are indicated by domains being annihilated at E2 or E1 respectively. Detectors at these positions instead of annihilators would, of course, register these changes. However, spurious signals also generate such change indications and the illustrative circuit is designed to ignore them.

The various overlay geometries for achieving the functions organized to implement the illustrative autonomous scanner operations are familiar in the art. For example, the propagation of and interaction between domains via T and bar-shaped overlays are well understood. Also, domain generation, annihilation, and domain detection, as would occur at 21 or 22, are well known. Accordingly, the overlay geometry is only discussed generally herein.

Similarly, an in-plane field source, a bias field source for generating a bias field to constrict domains, and source of periodic scan pulses for achieving the operation described, as well as utilization circuitry are well understood in the art and not described in detail here but merely represented in FIG. 1 by blocks 40, 41, 42, and 43, respectively, in FIG. 1. Any such circuit capable of operating in accordance with this invention may be used for these functions. The various circuits operate under the control of a control circuit represented in FIG. 1 by block 45.

It may be recognized that the circuit of FIG. 3 is initialized by filing the compressors '0—0', '1—1' and 25 and one of the registers 23 or 24 with domains. Normal scan operations as described will result in the filling of registers '1—1' and '0—0', although no outputs occur at 21 or 22 of FIG. 1 until the registers are filled. Scan operations occur at a relatively fast rate (millisecond rate) and, therefore, the lack of outputs for a few scan operations is a negligible inconvenience at worst.

Registers 25 and say 24 are not filled in this manner. A temporary domain generator of the type G shown in FIG. 1 may be employed during manufacture to fill register 24 in conventional fashion, however. As this is being done, consecutive domains generated at G of FIG. 1 and advanced in the complementary side of the arrangement fills compressor 25 and register '0—0' in a number in-plane field rotations equal to the combined number of stages in register '0—0' and compressor 25 or $n$, whichever is greater. The temporary generator may be removed or left in situ but deactivated by known techniques. Thereafter, normal operation will result in the filling of register '1—1' with the possibility of spurious outputs on 22 during the first few scan cycles.

It is contemplated that similar arrangements can be achieved in other than magnetic domain technology. For example, the various functions described in connection with FIGS. 2 and 3 can be achieved with integrated circuits employing AND gates at input, interaction, and output points. Similarly, semiconductor charge couple or charge transfer devices could be employed to this end as long as means were incorporated to periodically refurbish the information.

What has been described is considered merely illustrative of the principles of this invention. Accordingly, various alternatives may be devised by those skilled in the art in accordance with those principles within the spirit and scope of this invention.

What is claimed is:

1. A domain propagation arrangement comprising a sheet of material in which single wall domains can be moved, and a magnetically soft overlay juxtaposed with a surface of said sheet, said overlay having a geometry to define a $2n+k$ stage first register for moving single wall domains through a first interaction point from input to output positions in response to a reorienting in-plane field, said overlay at said interaction point having a geometry such that said channel folds back upon itself forming first, second, and third sections, said overlay at said interaction point also having a geometry to allow a domain into said third section only when a domain occurs in the like stages of said first and second sections.

2. An arrangement in accordance with claim 1 wherein each of said first and second sections comprises $n$ of said $2n+k$ stages.

3. An arrangement in accordance with claim 2 wherein said overlay also defines a second register like said first for synchronous operation therewith in response to said reorienting in plane field.

4. An arrangement in accordance with claim 2 including input means for providing in said first section of said first register a first domain pattern representative of the presence and absence of signals in $n$ lines.

5. An arrangement in accordance with claim 3 including input means adapted to provide in the first section of said first and second registers first and second complementary domain patterns representative of the presence and absence of signals in $n$ lines.

6. An arrangement in accordance with claim 5 wherein said input means comprises first and second arrangements of magnetically soft overlay elements for defining first and second $n$ stage input registers, said elements having geometries to define first and second laterally displaced stable positions for a domain in each of said stages, domain generating means for providing a domain in each of said $n$ stages of said first section of said first register, a first control electrical conductor coupled serially to said $n$ stages of said first register adapted to displace domains from said first register to said first input register when pulsed, $n$ electrical conductors coupled to the $n$ stages of said second input register for displacing corresponding domains from said first to said second register when signals are applied thereto, and second and third electrical conductors coupled serially to the $n$ stage of said first and second registers respectively for displacing domains from said first and second input registers to corresponding stages of said first section of each of said first and second registers respectively when pulsed.

7. An arrangement in accordance with claim 1 wherein said overlay defines a compressor arrangement in said third section.

8. An arrangement in accordance with claim 3 wherein said overlay defines a compressor arrangement in said third section of each of said first and second registers.

9. An arrangement in accordance with claim 8 wherein said overlay has a geometry for defining first and second domain annihilators at the terminus of said second sections of said first and second registers respectively.

10. An arrangement in accordance with claim 9 wherein said third sections of said first and second registers include first and second outputs and said overlay has a geometry for defining adjacent said outputs, respectively, first and second $n$ stage closed loop registers for recirculating single wall domains in response to a reorienting in-plane field, said overlay also defining a compressor arrangement including a first stage of each of said closed loop registers for selectively transferring a domain between said closed loop registers.

11. An arrangement in accordance with claim 10 wherein said overlay defines first and second interaction points between said first and second closed loop registers and said third sections of said first and second shift registers at said output positions respectively, said overlay at the terminus of each of said third sections being of a geometry to move domains to said domain annihilator there in the absence of a domain in the first stage of the associated one of said first and second closed loop shift registers and to deflect a domain in said third section to the corresponding output in the presence of a domain in that first position.

12. A circuit for signaling first and second changes in condition for each of a set of lines, said circuit comprising first and second shift register channels including first and second output positions respectively, means responsive to a first scan signal for storing complementary first and second sets of representations of the condition of said lines in said first and second registers respectively, means responsive to a second scan signal for storing complementary third and fourth sets of representations of the conditions of said lines also in said first and second registers respectively, means responsive to each of said scan signals for advancing said sets of representations in said registers synchronously, means for comparing consecutive representations in said first and third sets and said second and fourth sets of representations for generating complementary first and second persistent line condition indications, and means responsive to one of said first or second persistent line indications for each of said consecutive lines of said set for signaling only when the other of said first or second second persistent line indications next occurs for that line.

13. A combination comprising a sheet of material in which single wall domains can be moved, a magnetically soft overlay juxtaposed with a surface of said sheet, said overlay having a geometry for defining first and second $n$ stage closed loop registers for recirculating single wall domains in response to a reorienting in-plane field, said overlay also defining means including a first stage of each of said registers for selectively transferring a domain therebetween wherein said last-mentioned means comprises first and second domain propagation registers including first and second outputs respectively, said first and second outputs being in close proximity to said first and second closed registers at said outputs, respectively, said overlay at each of said outputs having a geometry for moving a domain in said first or second closed loop registers in a manner to interact with a domain in the associated propagation register to deflect said domains to the first stage of the other of said closed loop registers and to an associated one of said outputs.

14. A circuit for selectively signaling first and second changes in state in each of a plurality of lines, said circuit comprising first and second shift register channels including first and second output positions respectively, means responsive to consecutive scan signals for forming complementary first and second persistent state indications for consecutive ones of said lines in said first and second channels respectively, means for sequentially moving said indications to said first and second output positions for generating first or second persistent state signals there, control means for sequentially enabling said first or second output positions for consecutive ones of said lines, and means responsive to each of said first or second persistent state indications for each of said lines operative upon said control means for next enabling the alternative output position for that line.

15. A circuit for signaling first and second changes in the condition of each of a plurality of lines from a signal to a no-signal condition and from a no-signal to a signal condition respectively, said circuit comprising first and second shift register channels including first and second output positions respectively, means responsive to each of a sequence of command signals for storing a set of indications and the complements thereof representative of said line conditions in said first and second registers respectively and for advancing stored indications therein, means responsive to the presence of consecutive indications of like conditions for each of said lines for forming in said first and second registers respectively first and second indications of the persistence of a signal or no-signal condition for each of said lines for consecutive ones of said command signals and for advancing said persistence indications to said first and second output positions respectively, and means responsive to each of consecutive ones of said first and second persistence indications for enabling an output from only said second or first output position respectively for consecutive ones of said lines.

* * * * *